A. L. TERSTEGGE.
FEED OR WATER TROUGH.
APPLICATION FILED JUNE 22, 1915.
1,252,861.
Patented Jan. 8, 1918.
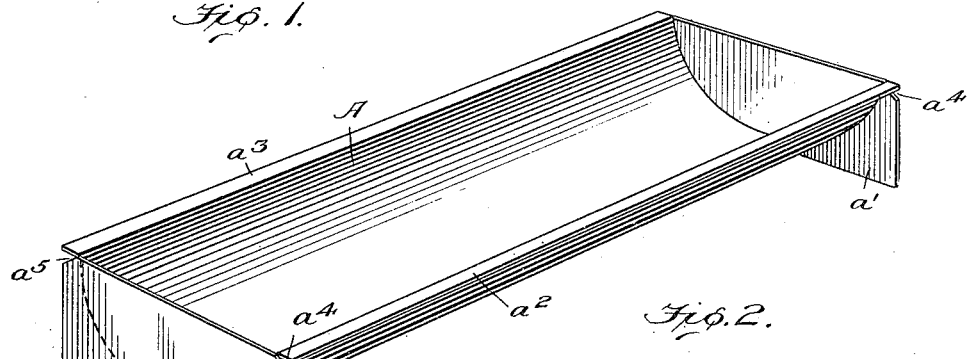
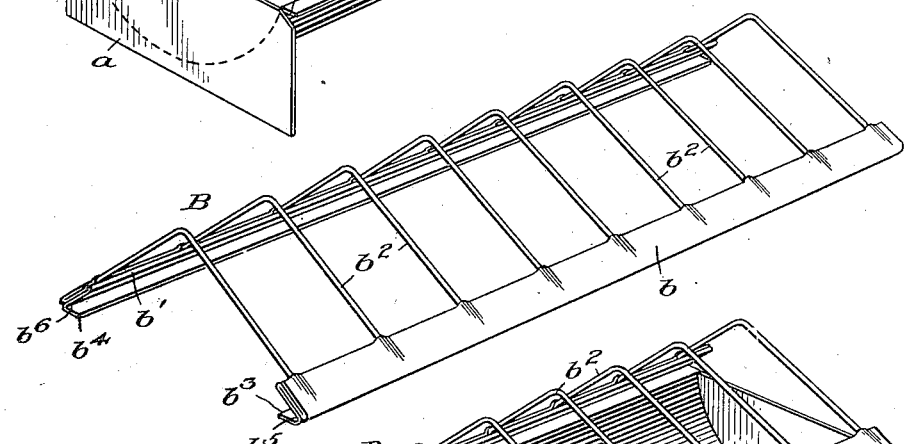
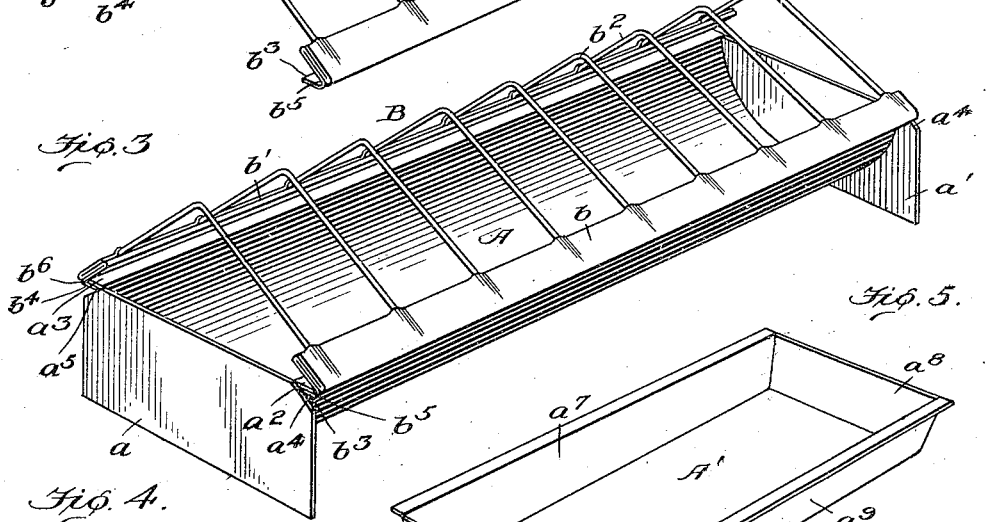
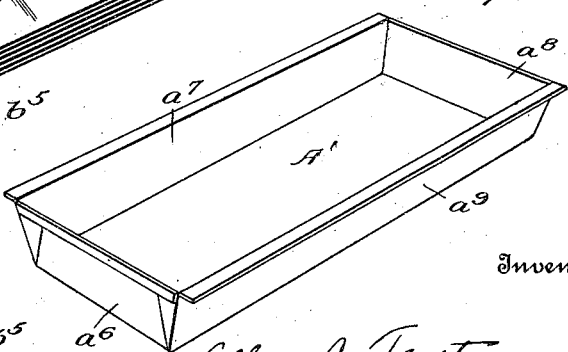
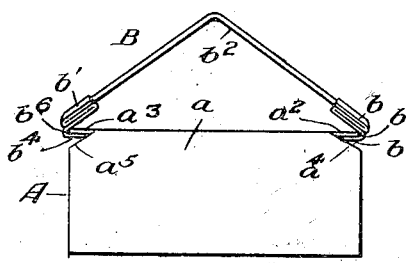
Inventor
Albert L. Terstegge
By
his Attorneys

UNITED STATES PATENT OFFICE.

ALBERT L. TERSTEGGE, OF LOUISVILLE, KENTUCKY, ASSIGNOR TO KENTUCKY STAMPING COMPANY, OF LOUISVILLE, KENTUCKY, A CORPORATION OF KENTUCKY.

FEED OR WATER TROUGH.

1,252,861.  Specification of Letters Patent.  Patented Jan. 8, 1918.

Application filed June 22, 1915. Serial No. 35,562.

*To all whom it may concern:*

Be it known that I, ALBERT L. TERSTEGGE, a citizen of the United States, residing at Louisville, in the county of Jefferson and State of Kentucky, have invented certain new and useful Improvements in Feed or Water Troughs; and I do hereby declare the following to be a full, clear, and exact description of the same, reference being had to the accompanying drawings, forming part of the specification, and to the figures and letters of reference marked thereon.

This invention relates to certain improvements in feed or water troughs for live stock, more particularly to a feed or water trough for chickens and other barnyard fowls.

The primary object of the invention is the provision of an exceedingly simple and inexpensive feed trough of this character. A more detailed object is to provide a protecting grid for the trough proper which may be securely but detachably secured to the trough, the improved construction preventing the grid from being displaced by the fowls, and at the same time permitting ready removal from the trough, when it is desired to clean the trough or replenish it with a new supply of feed or water.

A full understanding of the invention will be attained from the ensuing detailed description of a construction embodying the same in a preferred form, when taken in connection with the accompanying drawings, and the novel features of the invention will be particularly pointed out in the appended claims.

In the drawings,—

Figure 1 is a perspective of one form of feed or water receptacle.

Fig. 2 is a perspective of the protecting grid adapted for detachable engagement with the feed or water receptacle.

Fig. 3 is a perspective of the trough showing the protecting grid secured on the receptacle.

Fig. 4 is an end elevation of Fig. 3.

Fig. 5 is a perspective of a modified form of trough.

Like characters of reference in the several figures indicate the same parts.

As shown in the drawings, the feed or water receptacle is substantially rectangular in its horizontal plane, and in the form of Figs. 1 to 4, inclusive, comprises a semi-cylindrical or concave bowl A, the opposite open ends of which are closed by flat end pieces $a$, $a'$ secured to the bowl in any suitable manner. The end pieces $a$, $a'$ preferably project beyond the bottom of bowl A and thereby form supports for the bowl. The longitudinal sides of the bowl A are bent outwardly at their respective ends to form tongues $a^2$, $a^3$, which tongues extend along the opposite sides of the bowl A for purposes presently to be described. A convenient and cheap method of forming the bowl is to construct it of sheet metal, preferably galvanized to prevent poisoning of the contents of the bowl by chemical action, although it will be understood that the exact mode of manufacture is not an essential feature of the invention.

The protecting grid B consists of two longitudinal side members $b$, $b'$ spaced apart a distance substantially equal to the transverse dimension of the bowl. Having their ends connected with the longitudinal side members $b$, $b'$ are angular bars $b^2$ arranged in a series and in spaced relation along the side members. The spaces between the angular bars are preferably of sufficient width to permit access to the feed or water in the receptacle by a fowl, for instance, but not great enough to permit entry of the fowl into the receptacle. It is to be particularly noted that the arms of the respective bars $b^2$ extend angularly upwardly from the longitudinal side members $b$, $b'$ and the tilt of the bars arranged in this manner will prevent roosting of fowls on the bars and secure clean feed or water in the receptacle at all times.

The side members $b$, $b'$ are provided with longitudinal tongues $b^3$ $b^4$ each projecting inwardly at a sufficient angle from their respective side members to form grooves $b^5$ $b^6$ for coöperation with tongues $a^2$ $a^3$ on the bowl A.

From the foregoing description it will be understood that the grid B may be readily attached to bowl A by sliding it on the bowl, the tongues $a^2$ $a^3$ entering the grooves $b^5$, $b^6$, and securely holding the grid in position on the bowl. To prevent interference with the attachment or detachment of the grid with respect to bowl A the side upper ends of end pieces $a$, $a'$ are cut away as shown at $a^4$, $a^5$. The side members $b$, $b'$ of the grid may be constructed of sheet metal, preferably galvanized, and the bars preferably of wire of suitable thickness to give the required rigidity and strength. The entire arrangement is exceedingly simple and cheap to manufacture and the parts may be quickly disengaged for cleaning purposes or to renew the supply of feed or water in the receptacle.

In the modification illustrated in Fig. 5, the receptacle A' is substantially trough-shaped, having straight upreaching sides $a^6$, $a^7$, $a^8$, $a^9$. These sides may be flared in the usual manner, and the entire receptacle may be constructed from a suitable blank of galvanized sheet metal.

What is claimed is:

1. In combination with a trough having laterally extending lips on its opposite sides, a grid member composed of a plurality of wires supported at their ends by strips of sheet metal, said strips being bent upon themselves centrally, and each half bent back upon itself, one of said bent halves embracing the lips of the trough and the other firmly embracing the ends of said wires.

2. In combination with a trough having a plurality of lips, a wire grid, a plurality of strips of metal bent to W shape in cross section, one V of the W embracing one of the lips and the other V embracing the wire grid.

3. In a feed or water trough for live stock, the combination with a feed pan having longitudinally extending lips projecting outwardly from its opposite sides and upright supporting members mounted on its opposite ends forming closures for said ends, of a grid adapted to be mounted on said pan comprising side members and an intermedite grid portion composed of a plurality of spaced apart bars clamped in said side portions, inturned longitudinally extending lips on said side portions adapted to project beneath the lips on the pan and prevent vertical movement of the grid with respect to the pan, and cut away portions in the supporting members to permit passage of the lips of the grid, whereby the grid may be slid horizontally into locking engagement with the pan.

ALBERT L. TERSTEGGE

Copies of this patent may be obtained for five cents each, by addressing the "Commissioner of Patents, Washington, D. C."